United States Patent [19]

Warsaw

[11] Patent Number: 4,483,204
[45] Date of Patent: Nov. 20, 1984

[54] PRONY BRAKE DYNAMOMETER

[76] Inventor: Arthur J. Warsaw, 131 E. Main St., Colfax, Ill. 61728

[21] Appl. No.: 453,299

[22] Filed: Dec. 27, 1982

[51] Int. Cl.³ .............................................. G01L 3/16
[52] U.S. Cl. .............................. 73/862.12; 188/264 B
[58] Field of Search ........... 73/862.11, 862.12, 862.13, 73/117; 188/264 B, 264 E

[56] References Cited

U.S. PATENT DOCUMENTS

| | | | |
|---|---|---|---|
| 1,174,678 | 3/1916 | Carpenter et al. | 188/264 B |
| 1,498,877 | 6/1924 | Knee et al. | 188/264 B |
| 1,550,833 | 8/1925 | Meyers | 188/264 E |
| 1,874,129 | 8/1932 | Skinner | 188/264 E X |
| 2,191,261 | 2/1940 | Roberts . | |
| 3,068,689 | 12/1962 | Warsaw . | |
| 3,119,256 | 1/1964 | Hitt et al. . | |
| 3,366,211 | 1/1968 | May | 188/264 B |
| 3,698,243 | 10/1972 | Cline . | |
| 3,902,360 | 9/1975 | Cline . | |
| 4,023,656 | 5/1977 | Kuwahara et al. | 188/264 B |
| 4,062,233 | 12/1977 | Bonomo . | |

Primary Examiner—Charles A. Ruehl
Attorney, Agent, or Firm—Emrich, Lee, Brown & Hill

[57] ABSTRACT

An improved power absorption device of the general Prony brake design is capable of either applying to a rotating shaft either a fixed force or a force proportional to its rotational speed or for measuring mechanical power transferred to a rotating shaft by a prime mover. A stator shaft aligned with the rotating shaft is sealed within a cylindrical drum which is coupled to the rotating shaft and rotated thereby. A hydraulic system actuates a plurality of pistons in radially outward directions so as to frictionally engage the inner surface of the rotating drum. The resulting heat build-up is transferred through the finned, high-heat transfer lateral walls of the drum to water in a tank in which the rotating drum is located. Brake lubrication is provided by a closed lubricant circulation system within the rotating drum capable of providing efficient, uniform lubrication of the brake surfaces. The drum is sealed to prevent the loss of lubricant therefrom as well as water contamination therein while the level of lubricant in the brake cell is easily checked by visual means. The closed lubricant circulation system protects the friction material from wear and lubricant glazing and permits the brake to operate at high temperatures without lubricant loss due to "cook off". Means are provided for continuously filtering the brake lubricant for removing "slough off" friction material therefrom.

13 Claims, 3 Drawing Figures

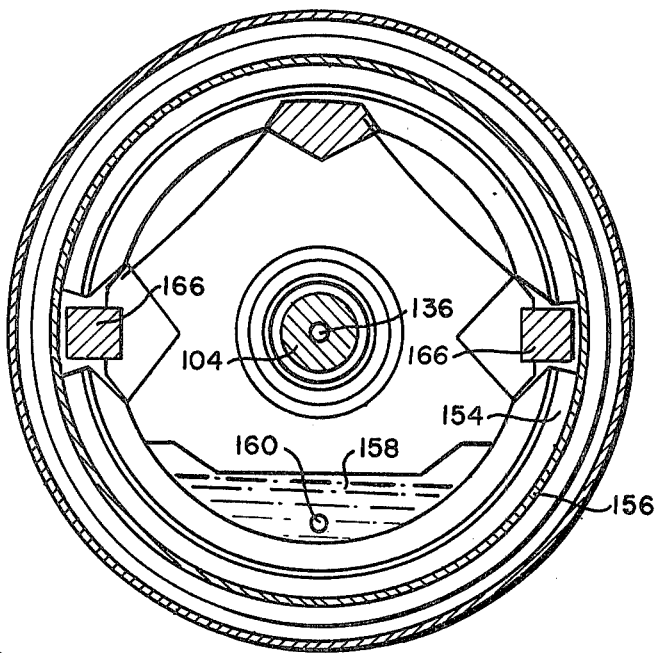
FIG. 3
FIG. 2
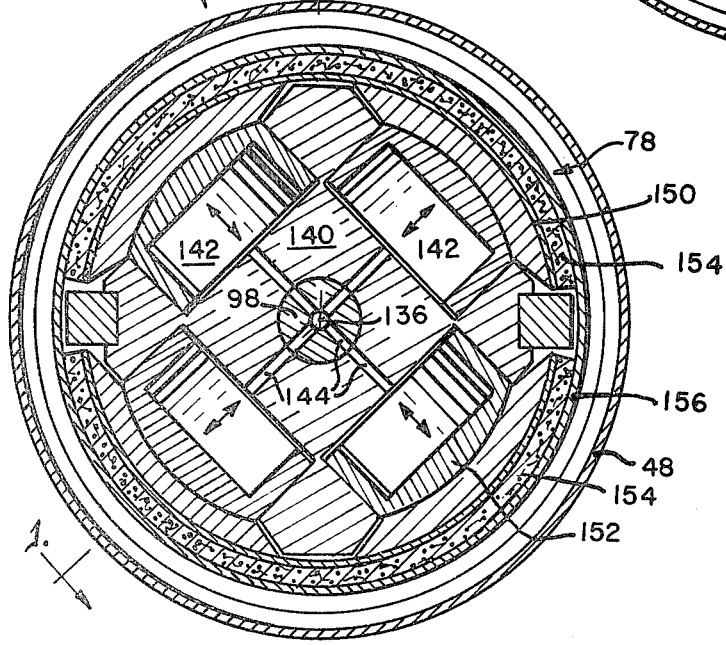

PRONY BRAKE DYNAMOMETER

BACKGROUND OF THE INVENTION

The present invention generally relates to rotational load absorption devices for measuring the power output of a prime mover and more specifically is directed to an improved Prony brake-type load absorption device or dynamometer providing a longer operating life, increased load measuring capacity and safer, more economical operation.

A Prony brake generally includes a rotating brake drum or disc connected with the output shaft of a prime mover, such as an internal combustion engine, and stationary friction pads or brake shoes that are engageable with the drum or disc in applying a retarding force thereto by frictional contact. The degree of retarding action is dictated by the force with which this frictional contact is applied. A Prony brake as described may be used simply as a power absorption device or, in combination with torque measuring means, as a dynamometer for testing the under-load performance characteristics of the prime mover.

Once widely used as a dynamometer absorption unit, the Prony brake design has become less popular because of the general belief that its maintenance is too high, its life expectancy too short, and its load stability too variable. Still, the Prony brake configuration offers many advantages in the dynamometer field in terms of economy of design and load varying characteristics. The present invention represents improvements in the basic Prony brake design substantially enhancing its attractiveness with respect to the aforementioned practical applications.

A friction brake operated as a dry, nonlubricated device has theoretically more torque/horsepower capacity per unit cost than any absorption device available. My earlier invention disclosed and claimed in U.S. Pat. No. 3,068,689 involves a dry brake absorption unit which is submersed under water in order to provide additional power absorption capacity. The disclosure of U.S. Pat. No. 3,068,689 is hereby incorporated by reference in the present application. A dry brake application operates very much the way that friction material is intended to be used in that a certain amount of breakdown of both the friction block, or material, and the metal casting itself occurs. This breakdown process exposes fresh contact points of both members in maintaining a reasonably constant and effective coefficient of friction until either one or both members require either reconditioning or replacement. The operation of a "dry" brake, however, creates problems relating to the "sluff off" of friction material particles which accumulate as dust. This dust is very destructive to bearings and seals and its accumulation causes recirculation problems and a somewhat unstable loading characteristic.

In any application save perhaps that of an automobile brake this type of nonlubricated friction engaging mechanism would have a usable lifetime of short duration. The accumulated residue of metal upon metal during the wearing process limits the lifetime of a conventional automobile brake to perhaps less than 100 hours of continuous, high energy absorption, rotational engagement. A dynamometer designed on the same limited operational basis as an automobile brake would be a design failure. A dynamometer application requires thousands of hours of accumulated operation before the occurrence of a major failure.

Water is the most common means for absorbing the mechanical equivalent of the heat generated in the power absorption process. At the same time, water is the most common limiting factor in the dynamometer operating environment. The vast majority of installations of power testing equipment suffer from shortages in water availability or are provided with expensive water supply installations. The major reason for this problem is that only 7% to 9% of the cooling capacity of water is utilized in the typical water impeller dynamometer.

The water impeller type of dynamometer requires a fixed amount of water usage which cannot be improved due to the formation of steam pockets on the receding edge of the impeller vanes. This negative pressure on the nonpressurized side of the impeller vane causes water to boil at a reduced temperature resulting in turbulence and a severe limitation on the impeller's capacity to provide a continuous, constant load or create torque resistance. In addition, the metallic impeller is subject to erosion in the form of sublimation due to the formation of these steam pockets on the impeller vanes. Not only is the impeller type of dynamometer limited in its loading capacity, but it also is severely temperature limited in that mineral dropout, or sublimation, becomes a very serious problem at temperatures above 140° F. The Prony brake type of dynamometer is thus a much more economical and efficient load absorption device than its impeller counterpart.

Another limitation in conventional dynamometer design involves the failure to take advantage of the full cooling capacity of water. At atmospheric pressure, water boils at 212° F. This provides 72° of heat usage per pound of water (also 72 BTU's) over that available in an impeller dynamometer. Water's big advantage, however, lies in its latent heat of evaporization which is 966 BTU'S per pound of water evaporated or an additional 966 BTU's plus the 72 BTU's in excess of the 140° impeller dynamometer limitation. The resulting 1,038 BTU's is available if the internal pressure of the evaporative device can be maintained at atmospheric pressure. Also operating in these conditions avoids excessive temperatures and the unsafe conditions associated therewith.

Prior art dynamometers incorporating a lubrication system also suffer from various limitations. In these systems a certain amount of lubrication provides protection of the internal contacting members and continues to do so up to a point where the lubricant either breaks down into its organic components or volatizes ("cooks off"). The breaking down of the organic lubricant results in the formation of a glazed coating on the friction material and a reduction in the torque engaging capacity. A skipping action can occur with the introduction of the lubricant between two smooth surfaces such as a smooth (glazed) brake lining and a smooth metal brake drum. Without this glazing, or breakdown, the service life of the lubricated brake unit is virtually unlimited. In addition, current dynamometer lubrication systems are unable to provide uniform lubrication between brake drum units or along the entire length of a brake unit, fail to confine the lubricant in a closed environment which becomes an important factor when expensive lubricants are used at high temperatures, and apply the lubricant to the engaging surfaces in a nonflowing manner.

The present invention does not suffer from these limitations in that it offers a Prony brake type of load absorption unit, or dynamometer with conventional measuring instrumentation coupled thereto, which has a circulating, closed lubrication system which not only substantially extends the usable lifetime of the components therein, but also allows the unit to achieve larger loading capacities without the need for increasing the unit's heat dissipation capacity.

SUMMARY OF THE INVENTION

The present invention is directed to a Prony brake-type arrangement for either absorbing the power of a rotating shaft or for measuring the output power of a prime mover by means of a rotating shaft coupled thereto. The brake assembly is enclosed in a sealed drum coupled to a rotating shaft and rotationally displaced thereby within a water-filled tank. Friction engaging surfaces positioned within the drum adjacent to its lateral surface are displaced radially outward by means of a plurality of opposed, hydraulically-actuated brake shoes symmetrically positioned about the axis of rotation. Frictional heat buildup is transferred via the thin, finned metallic lateral surface of the drum to the surrounding water reservoir, which may be either closed or circulating in nature. A closed lubrication system circulates a lubricant within the brake cell to provide a suitable coefficient of friction between the engaging surfaces at high operating temperatures without lubricant loss from the brake drum due to "cook off". By means of this improved, closed lubrication system and by completely submerging the brake assembly in the water-filled tank, excessively high water temperatures are avoided with system safety thus enhanced and water cooling requirements substantially reduced. In a preferred embodiment, a silicon lubricant is utilized within the brake drum and is continually circulated over the friction engaging surfaces for improved brake operation. Provision is also made for the continuous filtering of the lubricant for the removal of displaced friction material therefrom.

In the circulating lubrication system the lubricant is temporarily "trapped" away from the heated surfaces and then allowed to flow into the internal parts of the brake unit. The lubricant is then displaced from the friction engaging surfaces where maximum heating occurs by the rotation of the drum for improved brake cooling and limiting the operating temperature of the lubricant. "Sluff off" of friction material particles from the braking surfaces as encountered in "dry" brake systems is thus virtually eliminated and brake operation and reliability increased.

BRIEF DESCRIPTION OF THE DRAWINGS

The appended claims set forth those novel features believed characteristic of the invention. However, the invention itself, as well as further objects and advantages thereof will best be understood by reference to the following detailed description of a preferred embodiment taken in conjunction with the accompanying drawings, where like reference characters identify like elements throughout the various figures, in which:

FIG. 2 is a transverse sectional view taken along the line and in the direction of the arrows 2—2 of FIG. 1; and FIG. 3 is a transverse sectional view taken along the line and in the direction of the arrows 3—3 of FIG. 1.

DESCRIPTION OF THE PREFERRED EMBODIMENT

Figure 1:
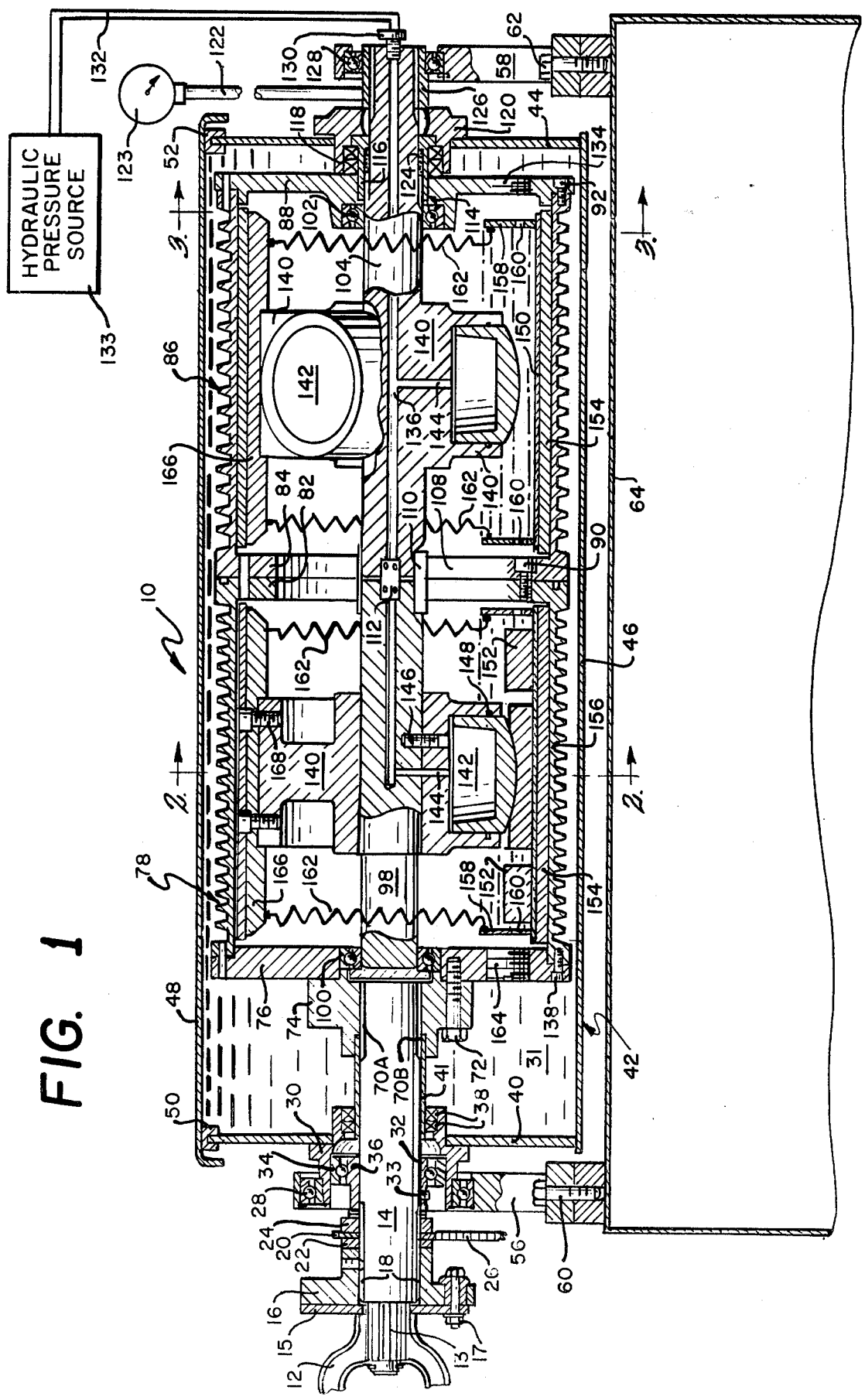
FIG. 1 is a longitudinal sectional view taken along the line and in the direction of the arrows 1—1 of FIG. 2, wherein is shown an improved prony brake dynamometer in accordance with the present invention.

Referring to FIG. 1, there is shown a longitudinal sectional view taken along the line 1—1 of FIG. 2 showing a Prony brake-type dynamometer 10 in accordance with a preferred embodiment of the present invention. A prime mover (not shown) is coupled to a universal yoke 12 which includes a shaft portion 13. Shaft portion 13 is keyed so as to engage an outer flange 15 which, in turn, rotates with universal yoke 12 in response to the action of the prime mover.

Outer flange 15 is rigidly coupled to inner flange 16 by means of a shear bolt 17. Inner flange 16 is, in turn, fixedly coupled to drive shaft 14 by means of recessed keying portions 18. Thus, drive shaft 14 rotates in response to the rotation of universal yoke 12 by virtue of the shaft coupling provided by linked outer and inner flanges 15, 16 and their respective shaft keying elements. Shear bolt 17 provides for the rapid disconnection of the drive shaft 14 from the universal yoke 12 in the event of an abnormal operating condition such as in the application of excessive torque values by the prime mover upon drive shaft 14.

Fixedly coupled to drive shaft 14 by means of keying elements 18 inserted in the drive shaft are outer and inner spacers 22, 24. Positioned between spacers 22, 24 is a sprocket wheel 20 having a plurality of teeth around its periphery which are engaged by a flexible link chain 26. Drive sprocket 20 may be used to drive a source of hydraulic oil or fluid, so as to provide a governor effect to the braking action of the present invention where the brake force applied to drive shaft 14 is a function of the torque output of the prime mover. Thus, the lower the revolutions per minute (RPM's), the smaller the load absorption applied to rotating shaft 14 by dynamometer 10. The operation and configuration of the braking assembly of dynamometer 10 is described in greater detail below. In addition, chain sprocket 20 may be utilized to drive a coolant pump (not shown) for circulating a liquid coolant in dynamometer 10 in providing heat dissipation therein proportional to the applied braking force. Finally, chain sprocket 20 may be employed to drive a tachometer (not shown) to provide the operator with the speed of revolution of the prime mover.

Moving toward the right with reference to FIG. 1 along drive shaft 14, an inner race 32 is fixedly coupled to drive shaft 14 by means of set screw 33 rotationally inserted therein. In contact with inner race 32 is a self-aligning bearing assembly 36 which is maintained in contact with inner race 32 by means of an outer race 34 located around the periphery thereof. Outer race 34 is, in turn, fixedly positioned within ball bearing housing 30 which abuts and extends through an aperture in a first lateral wall 40 of a tank 42. Thus, the combination of inner race 32, self-aligning bearing 36, outer race 34 and ball bearing housing 30 permits drive shaft 14 to be rotated while tank 42 remains essentially stationary. Tank 42 includes a second lateral wall 44 in facing relation to the first lateral wall 40. Positioned around the periphery of ball bearing housing 30 and between this housing and a stationary support 56 is tank cradle bearing 28. Thus, the tank is rotatable both with respect to the stationary support 56 and the drive shaft 14. The other end of tank 42 is rotationally positioned upon stationary support 58 in a manner described in detail below. Stationary supports 56, 58 are rigidly affixed to support platform 64 by means of bolts 60, 62, respectively. Support platform 64 thus provides a stable, rigid mounting base for dynamometer 10.

Within tank 40 the drive shaft 14 is enclosed in a race 41 with double seals 38 positioned in sealing relation between race 41 and that portion of ball bearing housing 30 which extends into tank 42. Double seals 38 thus provide for the confinement of a coolant liquid within tank 42 while permitting the free rotation of drive shaft 14 within tank 42. Tank 42 includes a cover 48 securely positioned on and in sealing contact with first and second lateral walls 40, 44 by means of gasket seals 50, 52, respectively. Tank 42, of course, includes additional lateral walls not shown in FIG. 1 since they are parallel to the plane of FIG. 1.

On the other end portion of race 41 is positioned on the periphery thereof and in close contact therewith a coupling flange 74. Coupling flange 74 is fixedly mounted on the right end of drive shaft 14 as viewed in FIG. 1 by means of keying elements 70A, 70B inserted in longitudinal slots in the surface of drive shaft 14. Flange 74 is, in turn, rigidly coupled by means of bolts 72 to a first lateral wall 76 of a first brake chamber 78. Thus, with first brake chamber 78 rigidly coupled to flange 74 which, in turn, is fixedly coupled to drive shaft 14, the rotation of drive shaft 74 by a prime mover will result in the corresponding rotation of first brake chamber 78. Flange 74 tightly encompasses drive shaft 14 and race 41 in preventing the flow of coolant liquid 31 from tank 42 into first brake chamber 78. A silicon sealant is also utilized at all spline connections in contact with water.

The first lateral wall 76 of first brake chamber 78 is coupled to a lateral portion 156 thereof by means of a plurality of bolts 138. First brake chamber 78 includes a second lateral wall 82 which is rigidly coupled by means of bolts 90 to a first lateral wall 84 of a second brake chamber 86. Second brake chamber 86, in turn, includes a second lateral wall 88 coupled by means of a plurality of bolts 92 to a lateral portion of second brake chamber 86. In this manner, a plurality of such brake chambers may be positioned along the axis of drive shaft 14 to provide increased energy absorption capacity such as for measuring the power of a prime mover.

Included in first and second brake chambers 78, 86 are stator shafts 98, 104, respectively, which are aligned with drive shaft 14. Lateral walls 82, 84 include an aperture 108 therein through which the stator shafts 98, 104 extend and in which they are coupled by means of splined keying elements 110 inserted in surface slots in the respective stator shafts. In addition, a hydraulic connector 112 couples the two stator shafts.

The rear portion of dynamometer 10, or that to the right of FIG. 1, includes a ball bearing 102 positioned between stator shaft 104 and the second lateral wall 88 of second brake chamber 86 which permits the free rotational displacement therebetween. Positioned immediately outward from ball bearing 102 and along stator shaft 104 is sleeve 116. Seals 118 are positioned between the inner portion of rear housing 120 and sleeve 116 to prevent the escape of liquid coolant from tank 42. In addition, a cartridge face-type seal 124 is positioned between stator shaft 104 and sleeve 116 to prevent the escape of lubricant from second brake chamber 86. A retaining shoulder 114 is positioned between ball bearing 102 and sleeve 116 to insure the proper seating and continued tight fit of the sleeve 116 and associated concentrically placed seals about stator shaft 104.

Positioned within the stator shafts and extending the length thereof is a stator hydraulic control line 136 which is coupled by means of pressure seal 130 to a hydraulic pressure source control line 132. The present invention envisions the use of any conventional source of hydraulic pressure which in FIG. 1 is shown as block 133. Aligned, adjacent sections of control line 136 in stator shafts 98 and 104 are coupled in a sealed manner by hydraulic connection 112. Positioned immediately adjacent to rear housing 120 is rear bearing mount 126 upon which is positioned a tank cradle bearing 128. The tank cradle bearing 128 is positioned within support 58 for allowing a limited degree of rotation of the tank 42 about its longitudinal axis. Coupled to stator shaft 104 is a torque pick off arm 122 by means of which the torque applied to the stator shafts by the braking mechanism of dynamometer 10 may be measured and provided to a conventional torque indicating means 123. The manner in which the torque is transmitted by the brake mechanism to the stator shafts is described below.

The operation of dynamometer 10 will now be described with reference to FIGS. 1, 2 and 3 where the latter figures represent transverse sectional views taken along the longitudinal axis of the dynamometer 10. FIG. 2 is a transverse sectional view of first brake chamber 78 while FIG. 3 is a transverse sectional view of second brake chamber 86. The first and second brake chambers 78, 86 operate in an identical manner and the following discussion will therefore be limited primarily to describing the configuration and operation of first brake chamber 78.

Referring to FIGS. 1 and 2, the operation of the brake mechanism of dynamometer 10 will now be described. A cylinder block casting 140 is positioned around and integral with stator shaft 98. Provided in cylinder block casting 140 are a plurality of cylinders symmetrically positioned with respect to the axis of stator shaft 98. Pistons 142 are positioned in mutually opposing relation on opposite sides of stator shaft 98 in these cylinders. In a preferred embodiment of the present invention, four symmetrically positioned pistons 142 are located in each brake chamber. Each piston 142 is connected to a hydraulic control line 144 which, in turn, is coupled to the stator hydraulic control line 136. Thus, the pistons are responsive to changes in hydraulic pressure as provided by a brake controller (not shown). With an increase in hydraulic pressure in the system, the pistons 142 will be displaced radially outward from the axis of stator shaft 98. A drive pin 146 is press-fit into stator shaft 98 and cylinder block casting 140 for securely coupling these structures as a unit.

Surrounding each piston 142 is a brake shoe casting 152 which contacts a backup plate 150. The outward displacement of piston 142 and brake shoe casting 152 results in the corresponding outward displacement of brake lining 154. The outward displacement of brake lining 154 places it in engaging contact with drum lateral wall 156 whereby a braking action is applied to the rotating drum in providing a counteracting force against the torque of the prime mover. Brake lining 154 is preferably a fibrous material having a high coefficient of friction. The lateral surface 156 of the first brake chamber 78 is comprised of a section of metal having high thermal conductivity and includes a plurality of fins on the outer surface thereof for facilitating heat transfer between the brake components and the coolant liquid surrounding the rotating drum. Once the hydraulic control pressure is removed from cylinder 142, it is returned to its original position by means of biasing springs 162 which may be connected to facing portions of the inner, brake assembly, such as to a torque bar 166 and a partition 158. A piston O-ring 148, which is positioned on cylinder block casting 140 is displaced radially with piston 142 to provide sealing contact between piston 142 and cylinder block casting 140. Thus, the hydraulic control medium will be confined within the cylinders should a leak in a control line occur.

A plurality of torque bars 166 are positioned around the lateral periphery of a brake chamber. Each torque bar is positioned between two immediately adjacent braking mechanisms and is rigidly coupled to cylinder block casting 140 by means of a pair of cap screws 168 inserted therein. The torque bars 166 prevent the backup plates 150 and the brake linings 154 from rotating with the drum. In addition, it is by means of these torque bars that the torque transferred to the rotating drum by the prime mover is sensed and transferred to stator shaft 98 permitting the output torque of the prime mover to be accurately measured.

Referring to FIGS. 1 and 3, the operation of the closed lubrication system within the rotating drums containing first and second brake chambers 78, 86 will now be explained. Included in the lower portion of each brake chamber are a pair of lubricant trough partitions 158 on opposite ends thereof. Contained between these trough partitions 158 is a lubricant, which in a preferred embodiment of the present invention is a silicon compound. Each partition includes an aperture 160 therein permitting the fluid contained between partitions 158 to flow toward the ends of the brake chamber and outward from the trough defined by partitions 158. The lubricant thus exiting via apertures 160 flows downward and in contact with brake lining 154 and the inner portion of the lateral wall 156 of the drum. It is in this manner that the lubricating fluid is circulated within the brake mechanism to provide lubrication between the contacting surfaces. The rotating action of the drum tends to displace the lubricant from the lower portion of the drum's lateral wall 156 around the inner perimeter thereof so that the lubricant is circulated to and comes in contact with each of the braking surfaces around the inner surface of the rotating drum. In addition, by circulating the lubricant at both ends of each individual brake chamber, the entire area of all of the braking surfaces therein are evenly and uniformly lubricated to provide a uniform coefficient of friction over the entire braking surfaces. The outer surface of each brake lining 154 is typically provided with a crisscrossed pattern of grooves through which the lubricant flows for increased lubricant circulation. A portion of the circulating lubricant is always confined between trough partitions 158 where it is not in contact with a heated surface and thus undergoes a reduction in temperature.

Following the circulation of the lubricant in the direction of the arrows in FIG. 2 adjacent the cooling fins and around the inner surface of the rotating drum, the lubricant contacts the non-torquing portion of frictional brake lining 154 adjacent torque bar 166 and flows back into the lubricant trough defined by the inner, lower surface of the drum's lateral wall 156 and partitions 158, as shown by the arrows indicating lubricant flow in FIG. 3. The lubricant is thus circulated throughout the entire brake chamber and during a full period of lubricant circulation effectively removes heat from the engaging frictional surfaces while providing for its own thermal dissipation upon its return to the lubricant trough. The lubricant thus flows back into the space between partitions 158 and subsequently flows out an aperture 160 in each of the partitions and the lubrication circulation cycle is once again initiated. Front and rear removable lubricant inspection plugs 164, 134 are respectively provided in first and second lateral walls 76, 88 to permit a visual check of the lubricant level. The aforementioned closed lubrication system may thus remain tightly sealed under normal operating conditions. The frictional brake linings 154 may comprise any suitable friction material such as conventional resin bonded asbestos friction material or any of the more common fibrous graphite friction materials increasingly being utilized in such applications. The fibrous character of the frictional brake linings 154 in each brake chamber permits the lubricant to flow therethrough and be filtered thereby. This provides for the removal of contaminants, particularly the residue deposited within the brake chamber by the frictional action between contacting surfaces. The porous nature of the brake lining thus performs a lubricant filtering action while providing for improved brake surface lubrication and frictional heat dissipation.

There has thus been described a Prony brake type of dynamometer which includes an internal, sealed, circulating lubrication system for lubricating the frictional engaging surfaces of the brake mechanism. This lubrication system permits the dynamometer to operate at higher temperatures and reduces wear on the contact surfaces therein. Heat build-up in a rotating drum coupled to the drive shaft and to which friction engaging means are applied is efficiently dissipated by means of a liquid coolant surrounding the rotating drum.

The matter set forth in the foregoing description and accompanying drawings is offered by way of illustration only and not as a limitation. Changes in construction will occur to those skilled in the art and various apparently different modifications and embodiments may be made without departing from the scope of the invention. The actual scope of the invention is intended to be defined in the following claims when viewed in a proper perspective against the prior art.

I claim:

1. A dynamometer for measuring the power output of a prime mover driving a rotating shaft comprising:
    a housing containing a heat-dissipating liquid therein, said housing including a lateral surface wherein said shaft is rotationally positioned in a sealed manner;
    a closed cylindrical drum positioned in said housing and submerged in said liquid, said drum rigidly coupled to said shaft so as to rotate about the cylindrical axis thereof;
    a hydraulic control system responsive to remotely generated control inputs and extending in a sealed manner through said housing and into said drum;
    brake means positioned within said drum and coupled to said hydraulic control system, said brake means responsive to said control inputs provided thereto and including an engaging surface for frictionally engaging the inner surface of said drum in opposing the driving torque of said primer mover;

a closed lubrication system within said drum for circulating a liquid lubricant subject to vaporization therein in lubricating the engaging surfaces of said brake means and said drum;

a stator shaft positioned within said drum in sealed engagement therewith so as to maintain said lubricant in sealed confinement therein and aligned along the axis of said rotating shaft such that said drum rotates about said stator shaft, said stator shaft coupled to said brake means wherein torque is transmitted to said stator shaft by the engagement by said brake means of the inner surface of said rotating drum; and means for measuring torque transmitted to said stator shaft when said drum is engaged by said brake means in opposing the driving torque of said prime mover.

2. A dynamometer as in claim 1 further comprising a fixed support structure rigidly mounted on said stator shaft within said drum and aligned along the axis thereof for supporting said brake means therein.

3. A dynamometer as in claim 2 wherein said brake means includes a plurality of opposed pistons positioned in said support structure, with said pistons symmetrically positioned and radially displaceable with respect to the axis of rotation of said drum for displacing the frictionally engaging surface thereof.

4. A dynamometer as in claim 1 wherein said lubrication system includes a trough in said drum for holding said lubricant, said trough defined by a lower portion of said brake means and two end partitions coupled thereto with said end partitions each including an aperture therein permitting said lubricant to flow out of said trough and between said brake means and said drum with said lubricant returned to said trough by the rotation of said drum.

5. A dynamometer as in claim 4 wherein said frictionally engaging surface comprises a porous, high friction material permitting said lubricant to flow therethrough and be filtered thereby prior to contacting the inner surface of said drum, whereby said lubricant is displaced upward by the rotation of said drum and is returned to said trough.

6. A dynamometer as in claim 1 further including a plurality of rigidly coupled cylindrical drums arranged in a linear array along the axis of rotation of said rotating shaft with each of said drums coupled to said hydraulic control system and including brake means, a lubrication system and a stator shaft therein.

7. A dynamometer as in claim 6 wherein the respective stator shafts of adjacent coupled drums are rigidly connected by means of a hydraulic coupling.

8. A dynamometer as in claim 1 wherein said heat dissipating liquid is circulated through said housing in removing heat from said brake means and said drum produced by the frictional engagement therebetween.

9. A dynamometer as in claim 1 wherein said lubricant is a silicon-based material with the loss of said lubricant due to vaporization prevented by said closed drum.

10. A dynamometer as in claim 1 wherein said hydraulic control system includes a fluid transport conduit system in said stator shaft for providing said remotely generated control inputs to said brake means.

11. A dynamometer as in claim 10 wherein said fluid transport conduit system includes an axial bore extending substantially over the length of said stator shaft, said axial bore continuous with and coupled to a plurality of radially extending ducts each leading to said brake means for controlling the operation thereof.

12. A dynamometer as in claim 11 wherein said means for measuring torque includes a plurality of torque bars for preventing the rotational displacement of said brake means when engaging said rotating drum and for transferring the torque of said prime mover to said stator shaft.

13. In a dynamometer for measuring the power output of a prime mover driving a rotating closed cylindrical drum by means of a rotating shaft coupled thereto and aligned therewith in a housing containing a liquid for dissipating heat produced by the frictional engagement of said drum by a plurality of brake means securely mounted within said drum so as to engage an inner lateral surface of said drum aligned along the axis of said rotating shaft, the improvement comprising: a closed lubrication system within said drum including first and second partitions defining a space therebetween and positioned immediately adjacent one of said brake means for confinging a lubricant therebetween, each of said partitions including an aperture therein for providing for the flow of said lubricant from between said partitions and onto said one of said brake means and rotating drum whereby said lubricant is circulated between said drum and the remaining brake means and returned to the space between said partitions in circulating fashion by the rotation of said drum.

* * * * *

UNITED STATES PATENT AND TRADEMARK OFFICE
CERTIFICATE OF CORRECTION

PATENT NO. : 4,483,204

DATED : November 20, 1984

INVENTOR(S) : Arthur J. Warsaw

It is certified that error appears in the above—identified patent and that said Letters Patent is hereby corrected as shown below:

Column 10, line 42, "confinging" should be -- confining --.

Signed and Sealed this

Seventh Day of May 1985

[SEAL]

Attest:

DONALD J. QUIGG

Attesting Officer     Acting Commissioner of Patents and Trademarks